United States Patent
Khamatnurova (10) Patent No.: US 10,533,125 B2
(45) Date of Patent: Jan. 14, 2020

(54) THIOL-ENE BASED RESIN SYSTEM FOR SAND CONSOLIDATION AND METHODS USING THEREOF

(71) Applicant: Halliburton Energy Services, Inc., Houston, TX (US)

(72) Inventor: Tatyana V. Khamatnurova, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/745,082

(22) PCT Filed: Aug. 21, 2015

(86) PCT No.: PCT/US2015/046366
§ 371 (c)(1),
(2) Date: Jan. 15, 2018

(87) PCT Pub. No.: WO2017/034526
PCT Pub. Date: Mar. 2, 2017

(65) Prior Publication Data
US 2018/0208829 A1 Jul. 26, 2018

(51) Int. Cl.
E21B 43/26 (2006.01)
C09K 8/575 (2006.01)
C09K 8/80 (2006.01)
C08G 75/045 (2016.01)
C08K 5/101 (2006.01)
(Continued)

(52) U.S. Cl.
CPC .......... *C09K 8/5751* (2013.01); *C08G 75/045* (2013.01); *C08K 5/101* (2013.01); *C08K 5/3492* (2013.01); *C08L 81/02* (2013.01); *C09K 8/805* (2013.01); *E21B 43/26* (2013.01); *C08L 2312/06* (2013.01)

(58) Field of Classification Search
CPC .... C09K 8/5751; C09K 8/805; C09K 8/5756; C08G 75/045; C08K 5/101; C08K 5/3492; C08L 81/02; C08L 81/62; C08L 2312/06
See application file for complete search history.

(56) References Cited

U.S. PATENT DOCUMENTS

| 5,921,317 A | 7/1999 | Dewprashad et al. |
| 2005/0059555 A1 | 3/2005 | Dusterhoft et al. |

(Continued)

FOREIGN PATENT DOCUMENTS

WO  2015088515  6/2015

OTHER PUBLICATIONS

International Search Report and Written Opinion for Application No. PCT/US2015/046366 dated May 2, 2016.

*Primary Examiner* — Silvana C Runyan
(74) *Attorney, Agent, or Firm* — Thomas Rooney; C. Tumey Law Group PLLC (57) ABSTRACT

A method of treating a subterranean formation including combining a long chain hydrocarbon viscosifier, an ene curing agent, and a thiol crosslinking agent to form a resin compound; coating the resin compound onto at least a portion of proppant particles to create resin-coated proppant particles; and placing the coated proppant particles into the subterranean formation zone, wherein the resin compound does not substantially cure prior to placing the resin coated proppant particles into the subterranean formation zone.

19 Claims, 2 Drawing Sheets

(51) Int. Cl.
    *C08K 5/3492*     (2006.01)
    *C08L 81/02*     (2006.01)

(56) References Cited

U.S. PATENT DOCUMENTS

| | | |
|---|---|---|
| 2005/0216649 A1 | 9/2005 | Yoshida et al. |
| 2010/0210480 A1* | 8/2010 | Ballard .................... C09K 8/36 507/117 |
| 2011/0272142 A1* | 11/2011 | Lewis ..................... C04B 28/02 166/247 |
| 2012/0220504 A1 | 8/2012 | Rickman et al. |
| 2013/0123381 A1 | 5/2013 | Bowman et al. |
| 2014/0216649 A1 | 8/2014 | Woods et al. |
| 2016/0215196 A1* | 7/2016 | Wang ........................ C09K 8/12 |
| 2017/0247296 A1* | 8/2017 | Salla ........................ C09K 8/44 |

* cited by examiner

THIOL-ENE BASED RESIN SYSTEM FOR SAND CONSOLIDATION AND METHODS USING THEREOF

BACKGROUND

The present invention generally relates to the use of curable resin treatment fluids in subterranean operations, and, more specifically, to the use of thiol-ene based resin treatment fluids comprising thiol-ene resin compounds and proppants, and methods of using these treatment fluids in subterranean operations.

Many petroleum-containing formations also contain unconsolidated granular mineral material such as sand or gravel. After completion, production of fluids from the formation causes the flow of the particulate matter into the wellbore, which often leads to any of several difficult and expensive problems. Unconsolidated subterranean zones include those which contain loose particulates that are readily entrained by produced fluids and those wherein the particulates making up the zone are bonded together with insufficient bond strength to withstand the forces produced by the production of fluids through the zone. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well.

Conventional treatment methods involve treating the porous, unconsolidated mass sand around the wellbore in order to cement the loose sand grains together, thereby forming a permeable consolidated sand mass which will allow production of fluids but which will restrain the movement of sand particles into the wellbore. These procedures create a permeable barrier or sieve adjacent to the perforations or other openings in the well casing which establish communication between the production formation and the production tubing, which restrains the flow of loose particulate mineral matter such as sand.

Oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. To accomplish this, a viscous fracturing fluid may be pumped down the casing to the formation at a rate and a pressure sufficient to form fractures that extend into the formation, providing additional pathways through which the oil or gas can flow to the well. A proppant is a solid material, typically treated sand or man-made ceramic materials, designed to keep an induced hydraulic fracture open, during or following a fracturing treatment. It is added to the fracturing fluid. After the fracturing procedure has been completed, it may be desirable to consolidate the proppant materials.

Typical sand consolidation treatments use plastic resins, and are not entirely satisfactory. Resins tend to reduce the permeability of the consolidated formation below acceptable levels. The toxicity of the plastic resins may also be an environmental issue. In addition, traditional "green" resins, such as mineral oil or vegetable based epoxy resins, may start having reduced modulus values at higher temperatures.

Accordingly, an ongoing need exists for environmentally friendly resin systems that may be used to provide increased conductivity for consolidating and fracturing operations in subterranean formations.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

The present invention discloses compositions for novel photopolymerizable/thermal resin systems for sand consolidation. In some embodiments, this resin system utilizes thiol-ene components as the reactive intermediates.

In various embodiments, the ternary resin system comprises of a thiol monomer, an ene monomer and lauryl acrylate monomer. When applied to a formation, the resin systems may provide enhanced functional group conversion, good UCS values, reduced oxygen inhibition, lower shrinkage, and excellent mechanical properties.

In some embodiments of the present invention, a method includes combining a long chain hydrocarbon viscosifier, an ene curing agent, and a thol crosslinking agent to form a resin compound; coating the resin compound onto at least a portion of proppant particles to create resin-coated proppant particles; and placing the coated proppant particles into a subterranean formation zone, wherein the resin compound does not substantially cure prior to placing the resin coated proppant particles into the subterranean formation zone. In certain embodiments, wherein the long chain hydrocarbon viscosifier comprises at least one of long chain acrylate, polyisobutylene, perfluorinated acrylates, 3-(trimethoxysilyl)propyl methacrylate, and combinations thereof. In other embodiments, the ene curing agent comprises at least one of 2,4,6-triallyloxy-1,3,5-triazine; 1,3,5-triacryloylhexahydro-1,3,5-triazine; tris[2-(acryloyloxy)ethyl] isocyanurate; 1,3,5-triallyl-1,3,5-triazine-2,4,6(1H,3H,5H)-trione, thiol-functionalized polysaccharides, and combinations thereof. In an embodiment, the thiol-functionalized polysaccharides comprise at least one of gelatin, hyaluronan, chitin, chitosan and combinations thereof. In certain embodiments, the thiol crosslinking agent comprises at least one of 2,2'(ethylenedioxy)diethanethiol; hexa(ethylene glycol) dithiol; trimethylolpropane tris(3-mercaptopropionate); pentaerythritol tetrakis(3-mercaptopropionate); bovine serum albumin, and combinations thereof. In an embodiment, the method further comprises an initiator including at least one of azobisisobutyronitrile, benzoyl peroxide, and combinations thereof. In certain embodiments, the ratio of thiol crosslinking agent to ene curing agent to long chain hydrocarbon viscosifier is in the range of from about 4:3:1 to about 4:1:3 by weight. In other embodiments, the resin-hardener volume by weight of sand is about 2% to about 10% or higher depending on the sand quality. In an embodiment, the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. In an embodiment, wherein the zone comprises proppant particles forming a proppant pack in a fracture within the subterranean formation zone. In another embodiment, at least a portion of the ene curing agent is encapsulated in a hydrolysable material. In some embodiments, the method further comprises a carrier fluid, wherein coated proppant particles are combined with the carrier fluid and placed in the subterranean formation zone. In an embodiment, the method further comprises at least one of a mixer, a pump, and combinations thereof, for combining the components of the resin compound proppant particles and introducing the compound and proppant particles into the formation.

In a further embodiment, a method includes combining a long chain hydrocarbon viscosifier, an ene curing agent, and a thiol crosslinking agent to form a resin compound; and coating the resin compound onto at least a portion of proppant particles to create resin-coated proppant particles, wherein the resin compound does not substantially cure during coating. In certain embodiments, wherein the long chain hydrocarbon viscosifier comprises at least one of long chain acrylate, polyisobutylene, perfluorinated acrylates, 3-(trimethoxysilyl)propyl methacrylate, and combinations thereof. In other embodiments, the ene curing agent comprises at least one of 2,4,6-triallyloxy-1,3,5-triazine; 1,3,5-triacryloylhexahydro-1,3,5-triazine; tris[2-(acryloyloxy)ethyl] isocyanurate; 1,3,5-triallyl-1,3,5-triazine-2,4,6(1H,3H,5H)-trione, thiol-functionalized polysaccharides, and combinations thereof. In an embodiment, the thiol-functionalized polysaccharides comprise at least one of gelatin, hyaluronan, chitin, chitosan and combinations thereof. In certain embodiments, the thiol crosslinking agent comprises at least one of 2,2'(ethylenedioxy)diethanethiol; hexa(ethylene glycol) dithiol; trimethylolpropane tris(3-mercaptopropionate); pentaerythritol tetrakis(3-mercaptopropionate); bovine serum albumin, and combinations thereof. In an embodiment, the method further comprises an initiator including at least one of azobisisobutyronitrile, benzoyl peroxide, and combinations thereof. In certain embodiments, the ratio of thiol crosslinking agent to ene curing agent to long chain hydrocarbon viscosifier is in the range of from about 4:3:1 to about 4:1:3 by weight. In other embodiments, the resin-hardener volume by weight of sand is about 2% to about 10% or higher depending on the sand quality.

In an embodiment, a method includes combining a long chain hydrocarbon viscosifier, an ene curing agent, and a thiol crosslinking agent to form a resin compound; coating the resin compound onto at least a portion of proppant particles to create resin-coated proppant particles; providing a fracturing fluid; mixing the resin-coated proppant particles with the fracturing fluid; and placing the fracturing fluid into a subterranean formation zone at a pressure sufficient to extend or create at least one fracture in the subterranean zone, wherein the resin compound does not substantially cure prior to placing the resin coated proppant particles into the subterranean formation zone. In certain embodiments, wherein the long chain hydrocarbon viscosifier comprises at least one of long chain acrylate, polyisobutylene, perfluorinated acrylates, 3-(trimethoxysilyl)propyl methacrylate, and combinations thereof. In other embodiments, the ene curing agent comprises at least one of 2,4,6-triallyloxy-1,3,5-triazine; 1,3,5-triacryloylhexahydro-1,3,5-triazine; tris[2-2' (acryloyloxy)ethyl] isocyanurate; 1,3,5-triallyl-1,3,5-triazine-2,4,6(1H,3H,5H)-trione, thiol-functionalized polysaccharides, and combinations thereof. In an embodiment, the thiol-functionalized polysaccharides comprise at least one of gelatin, hyaluronan, chitin, and combinations thereof. In certain embodiments, the thiol crosslinking agent comprises at least one of 2,2'(ethylenedioxy)diethanethiol; hexa(ethylene glycol) dithiol; trimethylolpropane tris(3-mercaptopropionate); pentaerythritol tetrakis(3-mercaptopropionate); bovine serum albumin, and combinations thereof. In an embodiment, the method further comprises an initiator including at least one of azobisisobutyronitrile, benzoyl peroxide, and combinations thereof. In some embodiments, the zone comprises proppant particles forming a proppant pack in a fracture.

An embodiment of the invention includes a method of treating a subterranean formation comprising: combining a long chain hydrocarbon viscosifier, proppant particles, an ene curing agent, and a thiol crosslinking agent to form a resin compound; placing the resin compound into a subterranean formation zone, wherein the resin does not substantially cure prior to placing the resin compound into the subterranean formation zone. In some embodiments, the proppant particles are at least partially coated with the long chain hydrocarbon viscosifier, and a thiol crosslinking agent before the ene curing agent is combined with the at least partially coated particles.

In many embodiments, the advantages of the invention may include at least one of the following: provides improved conversions of functional groups that subsequently enhances the polymeric network and results in increased performance of the resin system; provides an ability to react with a hydrophobic moiety to generate adequate viscosity in the system which potentially can serve as a diverting agent; reactive hydrophobic functionality of this system provides conductivity enhancing characteristics that may result in improved oil production.

Carrier Fluids

In some embodiments, carrier fluids are used to deliver the thiol-ene resin coated proppants into a wellbore. These fluids may be traditional drilling fluids, completion fluids, or fracturing fluids. The carrier fluids may be slick water with surfactants, fracturing fluids and brine. In certain embodiments, the carrier fluid comprises a non-aqueous base fluid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof.

Aqueous Base Fluids

The aqueous base fluid of the present embodiments can generally be from any source, provided that the fluids do not contain components that might adversely affect the stability and/or performance of the treatment fluids of the present invention. In various embodiments, the aqueous carrier fluid can comprise fresh water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm$^3$ or greater).

In some embodiments, the aqueous carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid.

Thiol-Ene Curable Resins

Figure 1:
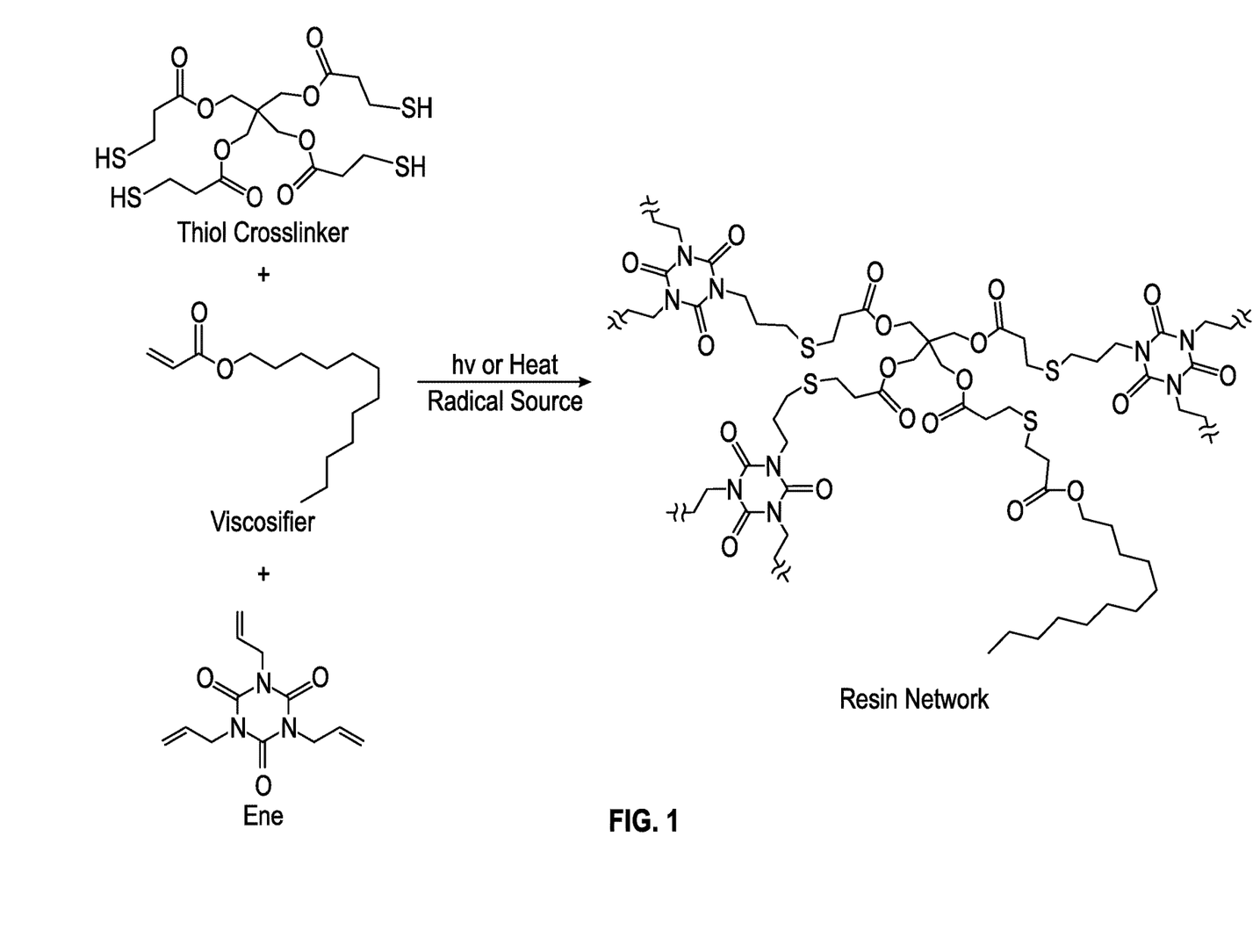
FIG. 1 shows the reaction scheme to form the thiol-ene resin components according to embodiments of the invention.

The thiol-ene reaction occurs between a thiol and an alkene to form an alkyl sulfide. The chain growth process may be used to form homogeneous polymer networks. Treatment fluids of the present invention comprise a thiolene curable resin. When a thiol-ene resin is allowed to react with a long chain hydrocarbon lauryl acrylate, the viscosity of the system is increased due to the chain entanglement between the long hydrocarbon chains. When thiol-ene chemistry is used as a curable resin system, the system may yield a superior resin network. Additionally, lauryl acrylate can serve as a tackifying agent and help in fines agglomeration. FIG. 1 is a schematic of the chemical reaction(s) for producing the thiol-ene resins according to embodiments of the invention.

Long Chain Hydrocarbon Viscosifiers

In an embodiment, the long chain hydrocarbon viscosifiers may generally be compounds with aliphatic chains, or compounds with long alkyl functionalities derived from natural sources such as, but not limited to, steric acid, palmitic acid, oleic acid or from petroleum based sources such as dodecyl styrene or polyethylene. The term "aliphatic" or "aliphatic group" as used herein means a straight-chain or branched hydrocarbon chain that is completely saturated or that contains one or more units of unsaturation.

In some embodiments, the viscosifier or tackifying agent may include but is not limited to, long chain acrylate, polyisobutylene, perfluorinated acrylates, 3-(trimethoxysilyl)propyl methacrylate, and combinations thereof.

In various embodiments, the amount of long chain viscosifier is about 1% to about 6% by volume of the resin.

In exemplary embodiments, the resin-curing agent volume by weight of sand is about 0.05% to about 100%. Alternatively, the maximum limit up to which the resin-curing agent volume can be used is the amount sufficient to completely block the proppant pack porosity, either consolidated or unconsolidated formation. Preferred ranges can vary between about 1% to about 20% depending upon sand size and quality. More preferably, the range should be about 3% to about 15%. A preferred embodiment is about 3%. An additional preferred embodiment is about 2% to about 10%.

Ene Curing Agents

The treatment fluids of the present invention also include a curing agent. In some embodiments, the curing agent is any compound that is capable of reacting with the thiol crosslinking agent and long chain hydrocarbon viscosifier to form polymeric chains.

Monomers having "-ene" or vinyl functional groups suitable for embodiments of the present invention include any monomer having one, or preferably more functional vinyl groups, i.e., reacting "C═C" or "C≡C" groups. The ene monomer can be selected from one or more compounds having vinyl functional groups. Vinyl functional groups can be selected from, for example, vinyl ether, vinyl ester, allyl ether, norbornene, diene, propenyl, alkene, alkyne, N-vinyl amide, unsaturated ester, N-substituted maleimides, and styrene moieties.

Non-limiting examples of ene curing agents include at least one member selected from the group consisting of 2,4,6-triallyloxy-1,3,5-triazine; 1,3,5-triacryloylhexahydro-1,3,5-triazine; tris[2-(acryloyloxy)ethyl] isocyanurate; 1,3,5-triallyl-1,3,5-triazine-2,4,6(1H,3H,5H)-trione, thiol-functionalized polysaccharides, and combinations thereof.

In an embodiment, the thiol-functionalized polysaccharides comprise at least one of gelatin, hyaluronan, chitin, chitosan and combinations thereof.

One of skill in the art will realize that the curing time is determined by many factors including resin-curing agent combinations, resin-curing agent mix ratios, temperature, and pressure.

In some embodiments, the ene curing agent is encapsulated in a hydrolysable material. In other embodiments, the initiator is encapsulated in a hydrolysable material. In further embodiments, at least one of the ene curing agent, an initiator, and combinations thereof is encapsulated in a hydrolysable material. In certain embodiments, the encapsulated hydrolysable material forms a capsule. Using encapsulated well treatment chemicals permits blending of normally incompatible compounds in the treatment fluid. As a non-limiting example, the present invention permits the transport of the hardener to a downhole environment by a treatment fluid having a neutral or basic pH without detrimentally impacting either the treatment fluid or the curing agent. A non-limiting list of mechanisms suitable for releasing the encapsulated hardener includes: a change in pH, crushing, rupture, dissolution of the membrane, diffusion and/or thermal melting of the encapsulating membrane. Following placement of the compounds downhole, the hardener is released from the capsules and allowed to react. The controlled downhole release of the hardener allows for delayed curing of the thiol-ene resins and proppants.

Having the benefit of the present disclosure and knowing the temperature and chemistry of a subterranean formation of interest, one having ordinary skill in the art will be able to choose a resin-curing agent combination and an amount thereof suitable for producing a desired coating of the proppant particulates.

Thiol Crosslinking Agents

Thiol bearing monomers suitable for embodiments of the present invention include any monomer having thiol (mercaptan or "SH") functional groups. Thiols are any of various organic compounds having the general formula RSH which are analogous to alcohols but in which sulfur replaces the oxygen of the hydroxyl group. Suitable thiol monomers have one or preferably more functional thiol groups and may be of any molecular weight.

In certain embodiments, the thiol crosslinking agent comprises at least one of 2,2'(ethylenedioxy)diethanethiol; hexa (ethylene glycol) dithiol; trimethylolpropane tris(3-mercaptopropionate); pentaerythritol tetrakis(3-mercaptopropionate); bovine serum albumin, and combinations thereof.

In various embodiments, the molar ratio of thiol crosslinking agent functional groups to ene curing agent functional groups is at least about 1.5:1. In other embodiments, the ratio is at least about 8.2:2.1 to about 8.2:6.1. In some embodiments, the resin-hardener volume by weight of sand is about 0.05% to about 100%. In exemplary embodiments, the resin-curing agent volume by weight of sand is about 1% to about 15%. A preferred embodiment is about 2%. An additional preferred embodiment is about 2% to about 10%.

Initiators

The invention may also include an initiator to help begin the free radical vinyl polymerization process. Photoinitiators have bonds that cleave using photolysis. This can form two alkyl radicals as well as nitrogen gas or oxygen gas. The organic azo compounds are also heat sensitive, and decompose to alkyl radicals and nitrogen. This initiator may including at least one of azobisisobutyronitrile ("AIBN"), benzoyl peroxide, and combinations thereof. If AIBN is used, a temperature of about 60° C. or greater may initiate the reaction.

In some embodiments, the amount of initiator is from about 5% to about 20% by weight of the resin, wherein the resin includes a thiol and an ene. In an embodiment, the viscosifier is an "ene" functionality thus making it a part of the "resin."

Proppants

In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the first treatment fluids or single treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the polymerizable aqueous consolidation composition. In some embodiments, the sand may be graded sand that is sized based on knowledge of the size of the lost circulation zone. The graded sand may have a particle size in the range of from about 10 to about 70 mesh, U.S. Sieve Series. In a preferred embodiment, 20/40 natural silica sand is used. In addition to best quality natural sand like Brady Sand or Northern White Sand; lower quality sand, i.e. sand having higher amount of impurities, higher amount of acid soluble materials and will give greater than about 10% fines even at lower overburden stresses like 2000 psi; may be used with this invention. For purposes of this disclosure, "poor quality sand" is any sand that exhibits at least one property of a) having a higher amount of impurities than Brady Sand or Northern White Sand, b) having a higher amount of acid soluble materials than Brady Sand or Northern White Sand, and c) giving greater than about 10% fines at lower overburden stresses such as those below about 2000 psi, and combinations thereof. Some non-limiting examples of poor quality sand include Nodosaria blanpiedi (NB), and River Sand.

In certain embodiments, the proppants are present in an amount of about 0.05% to about 60%. In exemplary embodiments, less than about 5% by volume of the treatment fluid. In other embodiments, the proppants are present in an amount of less than about 3% by volume of the treatment fluid.

In some embodiments, the proppants are coated with a thiol-ene based hardenable resin and a hardening agent before they have been placed downhole. In other embodiments, the proppants are coated after they have been placed in the subterranean formation.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the carrier fluid at a subsequent time. After the preblended liquids and the carrier fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable. Other potential applications of this resin system, with some minor adjustments such as modifying the dilution factor with the solvent carrier or component concentrations include: remedial proppant/gravel treatments, near-wellbore formation sand consolidation treatments for sand control, consolidating-while-drilling target intervals, and plugging-and-abandonment of wellbores in subterranean formations.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the consolidation treatment fluid is placed into a wellbore as a single stream and activated by downhole conditions to form a barrier that substantially seal lost circulation zones or other undesirable flowpaths.

In an embodiment, the consolidation treatment fluid may be introduced into the wellbore, the formation, or a lost circulation zone as a single pill fluid. That is, in such an embodiment, all components of the consolidation treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the lost circulation treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

For purposes of this disclosure, "overburden stress" refers to the load per unit area or stress overlying an area or point of interest in the subsurface from the weight of the overlying sediments and fluids. As an example, the "overburden stress" may be the load per unit area or stress overlying the hydrocarbon-bearing zone that is being conditioned or produced according to the embodiments described herein. In general, the magnitude of the overburden stress may primarily depend on two factors: 1) the composition of the overlying sediments and fluids, and 2) the depth of the subsurface area or formation. Similarly, underburden refers to the subsurface formation underneath the formation containing one or more hydrocarbon-bearing zones (reservoirs).

In various embodiments, systems configured for delivering the treatment fluids described herein to a downhole location are described. In various embodiments, the systems can comprise a pump fluidly coupled to a tubular, the tubular containing the thiol-ene based hardenable resin compositions, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
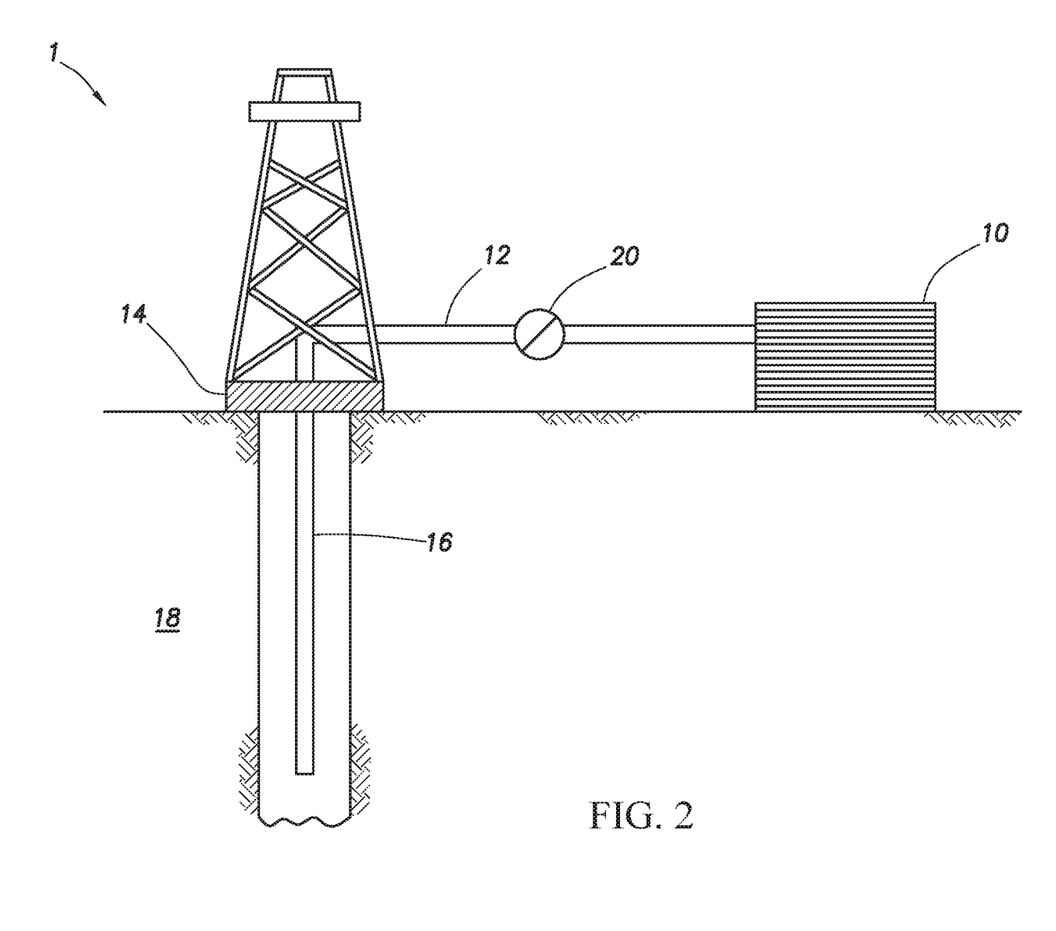
FIG. 2 depicts an embodiment of a system configured for delivering the thiol-ene resin composition comprising components of the embodiments described herein to a downhole location.

FIG. 2 shows an illustrative schematic of a system that can deliver treatment fluids of the embodiments disclosed herein to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

One of skill in the art will appreciate the many advantages of the present invention. The invention offers an environmentally acceptable resin system that may be used for on the fly coating. Various embodiments also increase the strength of ordinary sand, thereby reducing the need for expensive man-made proppants. Further, the invention is compatible with most fracturing fluids. Additionally, the resin concentration can be varied as per reservoir conditions with respect to temperature. Thus, one system may be sufficient for use over a wide range of temperatures. The invention may also be modified to suit varied reservoir conditions of overburden stresses. There are no anticipated pumping issues from a field equipment point of view due to the low initial viscosity due to the non-crosslinked state. Use of the compositions and methods of the present invention may provide little or no proppant flowback.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Experiment 1

Syringe test: Sand composition was prepared using 20-25-mesh Unifrack sand. For this, 50 g of sand was coated with a 2% (v/w) resin system containing pentaerythritol tetrakis (3-mercaptopropionate) (4 parts), 1,3,5-triallyl-1,3,5-triazine-2,4,6(1H,3H,5H)-trione (3 parts) and lauryl acrylate (1 part). Then, the resin coated sand sample was packed into the 60 ml syringe, and left to cure for 48 h at 150 F. After 48 h, a sample was tested using compression stress test, and the UCS data was obtained to be >300 psi. This data indicates that the novel thiol-ene based resin system exhibits a comparable performance in comparison to the currently available epoxy based resins systems.

Experiment 2

Curing Kinetics: The ternary thiol-ene resin system was prepared for DSC analysis in the following fashion: pentaerythritol tetrakis(3-mercaptopropionate) (4 parts), 1,3,5-triallyl-1,3,5-triazine-2,4,6(1H,3H,5H)-trione (3 parts) and lauryl acrylate (1 part) were mixed together to which the AIBN initiator was added to initiate polymer network. The sample was weighed and subjected to DSC analysis to monitor curing rate. The curing profile indicates that the curing is occurring at 150° F., whereas the control, experiment containing all of the components of the resin but without the initiator, does not indicate any curing at this temperature.

Embodiments disclosed herein include:

A: A method comprising: combining a long chain hydrocarbon viscosifier, an ene curing agent, and a thiol cross-linking agent to form a resin compound; coating the resin compound onto at least a portion of proppant particles to create resin-coated proppant particles; and placing the coated proppant particles into a subterranean formation zone, wherein the resin compound does not substantially cure prior to placing the resin coated proppant particles into the subterranean formation zone.

B: A method comprising: combining a long chain hydrocarbon viscosifier, an ene curing agent, and a thiol cross-linking agent to form a resin compound; and coating the resin compound onto at least a portion of proppant particles to create resin-coated proppant particles, wherein the resin compound does not substantially cure during coating.

C: A method comprising: combining a long chain hydrocarbon viscosifier, an ene curing agent, and a thiol cross-linking agent to form a resin compound; coating the resin compound onto at least a portion of proppant particles to create resin-coated proppant particles; providing a fracturing fluid; mixing the resin-coated proppant particles with the fracturing fluid; and placing the fracturing fluid into a subterranean formation zone at a pressure sufficient to extend or create at least one fracture in the subterranean zone, wherein the resin compound does not substantially cure prior to placing the resin coated proppant particles into the subterranean formation zone.

D: A method of treating a subterranean formation comprising: combining a long chain hydrocarbon viscosifier, proppant particles, an ene curing agent, and a thiol cross-linking agent to form a resin compound; and placing the resin compound into a subterranean formation zone, wherein the resin does not substantially cure prior to placing the resin compound into the subterranean formation zone.

Each of embodiments A, B, C, and D may have one or more of the following additional elements: Element 1: wherein the long chain hydrocarbon viscosifier comprises at least one of long chain acrylate, polyisobutylene, perfluorinated acrylates, 3-(trimethoxysilyl)propyl methacrylate, and combinations thereof. Element 2: wherein the ene curing agent comprises at least one of 2,4,6-triallyloxy-1,3,5-triazine; 1,3,5-triacryloylhexahydro-1,3,5-triazine; tris[2-(acryloyloxy)ethyl] isocyanurate; 1,3,5-triallyl-1,3,5-triazine-2,4,6(1H,3H,5H)-trione, thiol-functionalized polysaccharides, and combinations thereof. Element 3: wherein the thiol-functionalized polysaccharides comprise at least one of gelatin, hyaluronan, chitin, chitosan, and combinations thereof. Element 4: wherein the thiol crosslinking agent comprises at least one of 2,2'(ethylenedioxy)diethanethiol; hexa(ethylene glycol) dithiol; trimethylolpropane tris(3-mercaptopropionate); pentaerythritol tetrakis(3-mercaptopropionate); bovine serum albumin, and combinations thereof. Element 5: further comprising an initiator including at least one of azobisisobutyronitrile, benzoyl peroxide, and combinations thereof. Element 6: wherein the molar ratio of thiol crosslinking agent functional groups to ene curing agent functional groups is in the range of from about 8.2:2.1 to about 8.2:6.1. Element 7: wherein the resin compound volume by weight of proppant is about 2% to about 10%. Element 8: wherein the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. Element 9: wherein the zone comprises proppant particles forming a proppant pack in a fracture within the subterranean formation zone. Element 10: wherein at least a portion of at least one of the ene curing agent, the initiator, and combinations thereof is encapsulated in a hydrolysable material. Element 11: further comprising a carrier fluid, wherein coated proppant particles are combined with the carrier fluid and placed in the subterranean formation zone. Element 12: further comprising at least one of a mixer, a pump, and combinations thereof, for combining the components of the resin compound proppant particles and introducing the compound and proppant particles into the formation. Element 13: wherein the proppant particles are at least partially coated with the long chain hydrocarbon viscosifier, and a thiol crosslinking agent before the ene curing agent is combined with the at least partially coated particles. Element 14: wherein the ratio of thiol crosslinking agent to ene curing agent to long chain hydrocarbon viscosifier is in the range of from about 4:3:1 to about 4:1:3 by weight.

While preferred embodiments of the invention have been shown and described, modifications thereof can be made by one skilled in the art without departing from the teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method comprising:
   combining a long chain hydrocarbon viscosifier, an ene curing agent, and a thiol crosslinking agent to form a resin compound, wherein the thiol crosslinking agent to the ene curing agent comprises a molar ratio of about 8.2:2.1 to about 8.2:6.1;
   coating the resin compound onto at least a portion of proppant particles to create resin-coated proppant particles; and
   placing the resin-coated proppant particles into a subterranean formation zone, wherein the resin compound does not substantially cure prior to placing the resin-coated proppant particles into the subterranean formation zone.

2. The method of claim 1, wherein the hydrocarbon viscosifier comprises at least one of acrylate, polyisobutylene, perfluorinated acrylates, 3-(trimethoxysilyl)propyl methacrylate, and combinations thereof.

3. The method of claim 1, wherein the ene curing agent comprises at least one of 2,4,6-triallyloxy-1,3,5-triazine; 1,3,5-triacryloylhexahydro-1,3,5-triazine; tris[2-(acryloyloxy)ethyl] isocyanurate; 1,3,5-triallyl-1,3,5-triazine-2,4,6 (1H,3H,5H)-trione, thiol-functionalized polysaccharides, and combinations thereof.

4. The method of claim 3, wherein the thiol-functionalized polysaccharides comprise at least one of gelatin, hyaluronan, chitin, chitosan, and combinations thereof.

5. The method of claim 1, wherein the thiol crosslinking agent comprises at least one of 2,2'(ethylenedioxy)diethanethiol; hexa(ethylene glycol) dithiol; trimethylolpropane tris(3-mercaptopropionate); pentaerythritol tetrakis(3-mercaptopropionate); bovine serum albumin, and combinations thereof.

6. The method of claim 1, further comprising an initiator including at least one of azobisisobutyronitrile, benzoyl peroxide, and combinations thereof.

7. The method of claim 1, wherein the resin compound comprises a volume by weight of proppant of about 2% to about 10%.

8. The method of claim 1, wherein the proppant is at least one selected from the group consisting of: sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof.

9. The method of claim 1, wherein the subterranean formation zone comprises proppant particles forming a proppant pack in a fracture within the subterranean formation zone.

10. The method of claim 6, wherein at least a portion of at least one of the ene curing agent, the initiator, and combinations thereof is encapsulated in a hydrolysable material.

11. The method of claim 1, further comprising a carrier fluid, wherein coated proppant particles are combined with the carrier fluid and placed in the subterranean formation zone.

12. The method of claim 1, further comprising at least one of a mixer, a pump, and combinations thereof, for combining components of the resin compound and the proppant particles and introducing the compound and the resin-coated proppant particles into the subterranean formation zone.

13. A method comprising:
    combining a long chain hydrocarbon viscosifier, an ene curing agent, and a thiol crosslinking agent to form a resin compound, wherein the thiol crosslinking agent to the ene curing agent comprises a molar ratio of about 8.2:2.1 to about 8.2:6.1;
    coating the resin compound onto at least a portion of proppant particles to create resin-coated proppant particles;
    providing a fracturing fluid;
    mixing the resin-coated proppant particles with the fracturing fluid; and placing the fracturing fluid into a subterranean formation zone at a pressure sufficient to extend or create at least one fracture in the subterranean formation zone, wherein the resin compound does not substantially cure prior to placing the resin-coated proppant particles into the subterranean formation zone.

14. The method of claim 13, wherein the subterranean formation zone comprises proppant particles forming a proppant pack in a fracture.

15. A method of treating a subterranean formation comprising:
    Combining a hydrocarbon viscosifier, proppant particles, an ene curing agent, and a thiol crosslinking agent to form a resin compound, wherein the thiol crosslinking agent to the ene curing agent comprises a molar ratio of about 8.2:2.1 to about 8.2:6.1; and placing the resin compound into a subterranean formation zone, wherein the resin compound does not substantially cure prior to placing the resin compound into the subterranean formation zone.

16. The method of claim 15, wherein the hydrocarbon viscosifier comprises at least one of acrylate, polyisobutylene, perfluorinated acrylates, 3-(trimethoxysilyl)propyl methacrylate, and combinations thereof.

17. The method of claim 15, wherein the ene curing agent comprises at least one of 2,4,6-triallyloxy-1,3,5-triazine; 1,3,5-triacryloylhexahydro-1,3,5-triazine; tris[2-(acryloyloxy)ethyl] isocyanurate; 1,3,5-triallyl-1,3,5-triazine-2,4,6 (1H,3H,5H)-trione, thiol-functionalized polysaccharides, and combinations thereof.

18. The method of claim 15, wherein the thiol crosslinking agent comprises at least one of 2,2'(ethylenedioxy) diethanethiol; hexa(ethylene glycol) dithiol; trimethylolpropane tris(3-mercaptopropionate); pentaerythritol tetrakis(3-mercaptopropionate); bovine serum albumin, and combinations thereof.

19. The method of claim 15, wherein the proppant particles are at least partially coated with the long chain hydrocarbon viscosifier, and a thiol crosslinking agent before the ene curing agent is combined with the at least partially coated particles.

* * * * *